US011870134B2

(12) United States Patent
Isik et al.

(10) Patent No.: US 11,870,134 B2
(45) Date of Patent: Jan. 9, 2024

(54) BASE STATION ANTENNAS HAVING RADIATING ELEMENTS WITH SHEET METAL-ON DIELECTRIC DIPOLE RADIATORS AND RELATED RADIATING ELEMENTS

(71) Applicant: CommScope Technologies LLC, Hickory, NC (US)

(72) Inventors: Ozgur Isik, Wentworth Point (AU); Hemanshu Duggal, Marsfield (AU)

(73) Assignee: CommScope Technologies LLC, Hickory, NC (US)

( * ) Notice: Subject to any disclaimer, the term of this patent is extended or adjusted under 35 U.S.C. 154(b) by 912 days.

(21) Appl. No.: 16/619,373

(22) PCT Filed: May 2, 2018

(86) PCT No.: PCT/US2018/030606
§ 371 (c)(1),
(2) Date: Dec. 4, 2019

(87) PCT Pub. No.: WO2019/009951
PCT Pub. Date: Jan. 10, 2019

(65) Prior Publication Data

US 2020/0161748 A1 May 21, 2020

Related U.S. Application Data

(60) Provisional application No. 62/528,611, filed on Jul. 5, 2017.

(51) Int. Cl.
*H01Q 21/26* (2006.01)
*H01Q 1/24* (2006.01)
(Continued)

(52) U.S. Cl.
CPC ............... *H01Q 1/246* (2013.01); *H01Q 5/42* (2015.01); *H01Q 5/48* (2015.01); *H01Q 9/16* (2013.01);
(Continued)

(58) Field of Classification Search
CPC .. Y10T 29/49016; H01Q 21/08; H01Q 21/24; H01Q 21/26; H01Q 21/28; H01Q 15/14;
(Continued)

(56) References Cited

U.S. PATENT DOCUMENTS 6,067,053 A 5/2000 Runyon et al.
10,027,180 B1 * 7/2018 Hosseini ................. H01Q 1/44
(Continued)

FOREIGN PATENT DOCUMENTS

CN 1107995 C 5/2003
CN 101330163 A 12/2008
(Continued)

OTHER PUBLICATIONS

International Search Report and Written Opinion of the International Searching Authority, International Application No. PCT/US2018/030606, dated Jul. 23, 2018, 11 pp.
(Continued)

*Primary Examiner* — Livius R. Cazan
(74) *Attorney, Agent, or Firm* — Myers Bigel, P.A.

(57) ABSTRACT

A radiating element for a base station antenna includes a feed stalk and a cross-dipole radiator mounted thereon. The cross-dipole radiator includes a dielectric mounting substrate, a first metal dipole that extends along a first axis on the dielectric mounting substrate, a second metal dipole that extends along a second axis on the dielectric mounting substrate that is generally perpendicular to the first axis, and an adhesive layer between the dielectric mounting substrate and the first and second metal dipoles.

11 Claims, 13 Drawing Sheets

(51) Int. Cl.

| | |
|---|---|
| ***H01Q 5/48*** | (2015.01) |
| ***H01Q 9/16*** | (2006.01) |
| ***H01Q 21/08*** | (2006.01) |
| ***H01Q 21/28*** | (2006.01) |
| ***H01Q 21/24*** | (2006.01) |
| ***H01Q 15/14*** | (2006.01) |
| ***H01Q 5/42*** | (2015.01) |
| *H01Q 1/42* | (2006.01) |

(52) U.S. Cl.
CPC ............. *H01Q 15/14* (2013.01); *H01Q 21/08* (2013.01); *H01Q 21/24* (2013.01); *H01Q 21/26* (2013.01); *H01Q 21/28* (2013.01); *H01Q 1/42* (2013.01); *Y10T 29/49016* (2015.01)

(58) Field of Classification Search
CPC .. H01Q 9/16; H01Q 5/42; H01Q 5/48; H01Q 1/246; H01Q 1/42
USPC ............................................................ 29/600
See application file for complete search history.

(56) References Cited

U.S. PATENT DOCUMENTS

| | | | | |
|---|---|---|---|---|
| 2007/0069970 | A1 | 3/2007 | Argaman et al. | |
| 2007/0241983 | A1* | 10/2007 | Cao | H01Q 21/26 343/797 |
| 2010/0171675 | A1 | 7/2010 | Borja et al. | |
| 2014/0327591 | A1 | 11/2014 | Kokkinos | |
| 2015/0070234 | A1* | 3/2015 | Jones | H01Q 21/28 343/797 |
| 2015/0202004 | A1 | 7/2015 | Bonn et al. | |
| 2015/0255882 | A1 | 9/2015 | Segador et al. | |
| 2016/0275322 | A1 | 9/2016 | Carrender | |
| 2017/0054216 | A1* | 2/2017 | Shi | H01Q 9/285 |
| 2017/0085009 | A1 | 3/2017 | Watson | |

FOREIGN PATENT DOCUMENTS

| | | | | |
|---|---|---|---|---|
| CN | 1102709676 | A | 10/2012 | |
| CN | 202839949 | U | 3/2013 | |
| CN | 103151602 | A | 6/2013 | |
| CN | 203166098 | U | 8/2013 | |
| CN | 203386887 | U | 1/2014 | |
| CN | 103682678 | A | 3/2014 | |
| CN | 1103947041 | A | 7/2014 | |
| CN | 104143699 | A | 11/2014 | |
| CN | 104953241 | A | 9/2015 | |
| CN | 105406188 | A | 3/2016 | |
| CN | 105449361 | A | 3/2016 | |
| CN | 105684217 | A | 6/2016 | |
| CN | 103779658 | B | 8/2016 | |
| CN | 105896071 | A | 8/2016 | |
| CN | 106684549 | A | 5/2017 | |
| EP | 2712022 | A1 * | 3/2014 | H01Q 1/22 |
| EP | 3035438 | A1 | 6/2016 | |
| EP | 3035438 | A1 * | 6/2016 | H01Q 1/246 |
| EP | 3619770 | A1 | 3/2020 | |
| JP | 2000183633 | A * | 6/2000 | |
| JP | 2009065253 | A * | 3/2009 | |
| JP | 2014039192 | A | 2/2014 | |
| JP | 2015114672 | A * | 6/2015 | |
| KR | 20050069746 | A | 7/2005 | |
| KR | 20120130682 | A | 12/2012 | |
| KR | 101709318 | B1 | 2/2017 | |
| TW | 200701556 | A | 1/2007 | |
| WO | WO-2009072974 | A1 * | 6/2009 | H01Q 1/1207 |
| WO | WO-2016017278 | A1 * | 2/2016 | H01Q 1/1207 |
| WO | 2016114990 | A1 | 7/2016 | |
| WO | WO-2017010449 | A1 * | 1/2017 | G06K 19/077 |

OTHER PUBLICATIONS

"Chinese Office Action in Corresponding Application No. 202110555161.7, dated Jun. 6, 2023, 8 pages (18 total pages)".
"First Office Action for Chinese Application No. 2018800385903, dated Sep. 14, 2020".
"Supplementary European Search Report for corresponding European Patent Application No. EP 18 82 8700, dated Feb. 8, 2021, 19 pgs".
"Second Office Action for Chinese Application No. 201880044746.9, dated Mar. 22, 2021".
"Chinese Office Action in Corresponding Application No. 202110555161.7, dated Sep. 4, 2023, 9 pages (18 total pages)".

* cited by examiner

BASE STATION ANTENNAS HAVING RADIATING ELEMENTS WITH SHEET METAL-ON DIELECTRIC DIPOLE RADIATORS AND RELATED RADIATING ELEMENTS

CROSS-REFERENCE TO RELATED APPLICATIONS

The present application is a 35 U.S.C. § 371 national stage application of PCT Application No. PCT/US2018/030606, filed on May 2, 2018, which itself claims priority to U.S. Provisional Patent Application Ser. No. 62/528,611, filed Jul. 5, 2017, the entire contents of both of which are incorporated herein by reference as if set forth in their entireties. The above-referenced PCT Application was published in the English language as International Publication No. WO 2019/009951 A1 on Jan. 10, 2019.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells." Each cell may be served by a respective base station. Each base station may include one or more base station antennas that are configured to provide two-way radio frequency ("RF") communications with fixed and mobile subscribers (or "users") that are located within the cell served by the base station. In many cases, a base station may be divided into "sectors." For example, in one common configuration, a hexagonally shaped cell is divided into three 120° sectors in the azimuth plane (i.e., the plane defined by the horizon) and each sector is served by one or more base station antennas to provide full 360° coverage in the azimuth plane.

Each base station antenna may include one or more vertically-oriented linear arrays of radiating elements. Each linear array of radiating elements may generate a radiation pattern (also referred to herein as an "antenna beam") that is directed outwardly in the general direction of the horizon. In some cases two or more of the vertically-oriented linear arrays of radiating elements may be designed to work together to generate a single (narrower) antenna beam. Multiple linear arrays of radiating elements may be provided on a base station antenna to, for example, provide cellular service in multiple frequency bands and/or to reduce the azimuth beamwidth of the antenna beam. The number of radiating elements in each linear array is typically based on a desired beamwidth in the elevation plane, where the elevation beamwidth refers to the angular extent of the antenna beam along an axis that is perpendicular to the azimuth plane.

The radiating elements of each linear array are most typically implemented as dipole radiating elements, although other types of radiating elements such as patch radiating elements are sometimes used. Most base station antennas now use radiating elements that employ cross-dipole radiators that have first and second dipoles that are arranged to transmit/receive RF signals at orthogonal polarizations. The slant −45°/+45° cross-dipole radiator approach is most typically used, where one of the dipoles transmits and receives at a first linear polarization that is arranged at an angle of −45° with respect to the longitudinal axis of the linear array, while the other one of the dipoles transmits and receives at a second linear polarization that is arranged at an angle of +45° with respect to the longitudinal axis of the linear array. Both dipoles are typically mounted in front of and parallel to a ground plane such as metal reflector that is coupled to electrical ground. Typically, the dipoles are mounted at a distance of about 0.16κ to 0.25λ above the ground plane, where λ is the wavelength corresponding to a center frequency of the frequency band at which the radiating element is designed to operate.

Radiating elements are known in the art that have dipole radiators formed using metal rods, sheet metal, printed circuit boards, and a variety of other materials. As multi-band base station antennas have been introduced that include two or more linear arrays of radiating elements that operate in different frequency bands, the designs of the dipole radiators have tended to become more complicated, in an effort to decouple the radiating elements of different frequency bands as much as possible. The dipole radiators of these radiating elements are often implemented using printed circuit boards.

DETAILED DESCRIPTION

Figure 1:
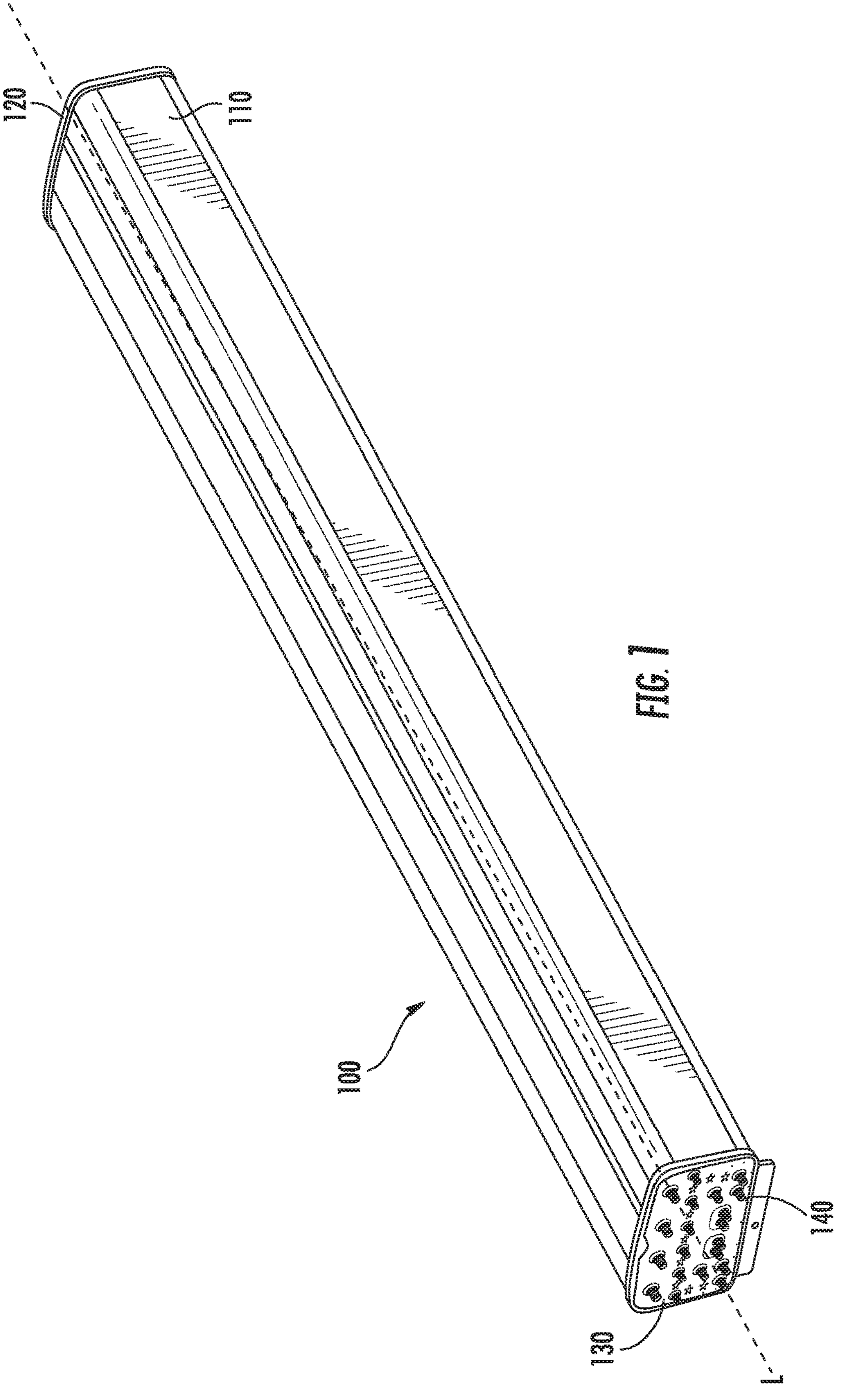
FIG. 1 is a front perspective view of a base station antenna according to embodiments of the present invention.

Embodiments of the present invention relate generally to radiating elements for base station antennas that include dipole radiators that are formed of pieces of sheet metal that are adhered to a dielectric mounting support. The pieces of sheet metal may form one or more dipoles. The sheet metal dipoles may be mounted onto the dielectric mounting support using an adhesive. The dielectric mounting support may physically support the sheet metal dipoles to reduce the tendency of the thin dipoles to move and/or bend during use. Herein, such dipole radiators may be referred to as "sheet metal-on-dielectric radiators."

As noted above, base station antennas having printed circuit board-based dipole radiators are known in the art. Printed circuit boards, however, may be relatively expensive. Aluminum and/or copper sheet metal may be relatively inexpensive and can easily be stamped to form desired planar shapes. Consequently, the dipole radiators according to embodiments of the present invention may be cheaper than printed circuit board-based dipole radiators. Moreover, one potential difficulty with printed circuit board based-dipole radiators is that the thickness of the metal layers on standard printed circuit boards may be less than desirable to ensure low signal transmission loss and good impedance matching with the feeding RF transmission lines. While printed circuit boards can be fabricated to have thicker metal layers, these non-standard printed circuit boards may cost significantly more. Since state-of-the art multi-band base station antenna may have a large number of radiating elements (e.g., 25-40), the use of such specialized printed circuit boards can have measurable impact on the price of a base station antenna. The sheet metal-on-dielectric dipole radiators according to embodiments of the present invention may be formed to have any desired thickness, and hence may exhibit improved impedance matching and/or reduced signal transmission losses as compared to low-cost printed circuit board based dipole radiators.

The radiating elements having sheet metal-on-dielectric dipole radiators according to embodiments of the present invention may also exhibit improved passive intermodulation ("PIM") distortion performance as compared to printed circuit board based dipole radiators. In particular, metal layers on printed circuit boards generally have a relatively high degree of surface roughness, which may help reduce the possibility that layers of the printed circuit board delaminate. This surface roughness may, however, be a source for PIM distortion. Moreover, while printed circuit boards having reduced levels of surface roughness may be obtained, these printed circuit boards cost more and still have some degree of surface roughness. As a result, radiating elements formed using printed circuit board based dipole radiators may tend to exhibit higher levels of PIM distortion. Sheet metal may be readily obtained that has very low levels of surface roughness, and can also be readily and inexpensively polished to further reduce surface roughness. Accordingly, the radiating elements according to embodiments of the present invention may be cheaper than conventional radiating elements that use printed circuit board based dipole radiators and may also provide enhanced performance.

In some embodiments, the sheet metal-on-dielectric dipole radiators according to embodiments of the present invention may be formed as non-planar elements. This may allow the dipoles to have a desired electrical length while reducing the "footprint" of each dipole (i.e., the size of the dipole when viewed from the front of the antenna). By reducing the footprint, the physical spacing between the radiating elements of adjacent linear arrays may be increased, which may reduce the impact that adjacent radiating elements have on their respective radiation patterns. In other embodiments, the dielectric mounting substrate may include an integrated dipole support structure to reduce manufacturing costs and improve the physical stability of the radiating element.

Embodiments of the present invention will now be described in further detail with reference to the attached figures.

Figure 2:
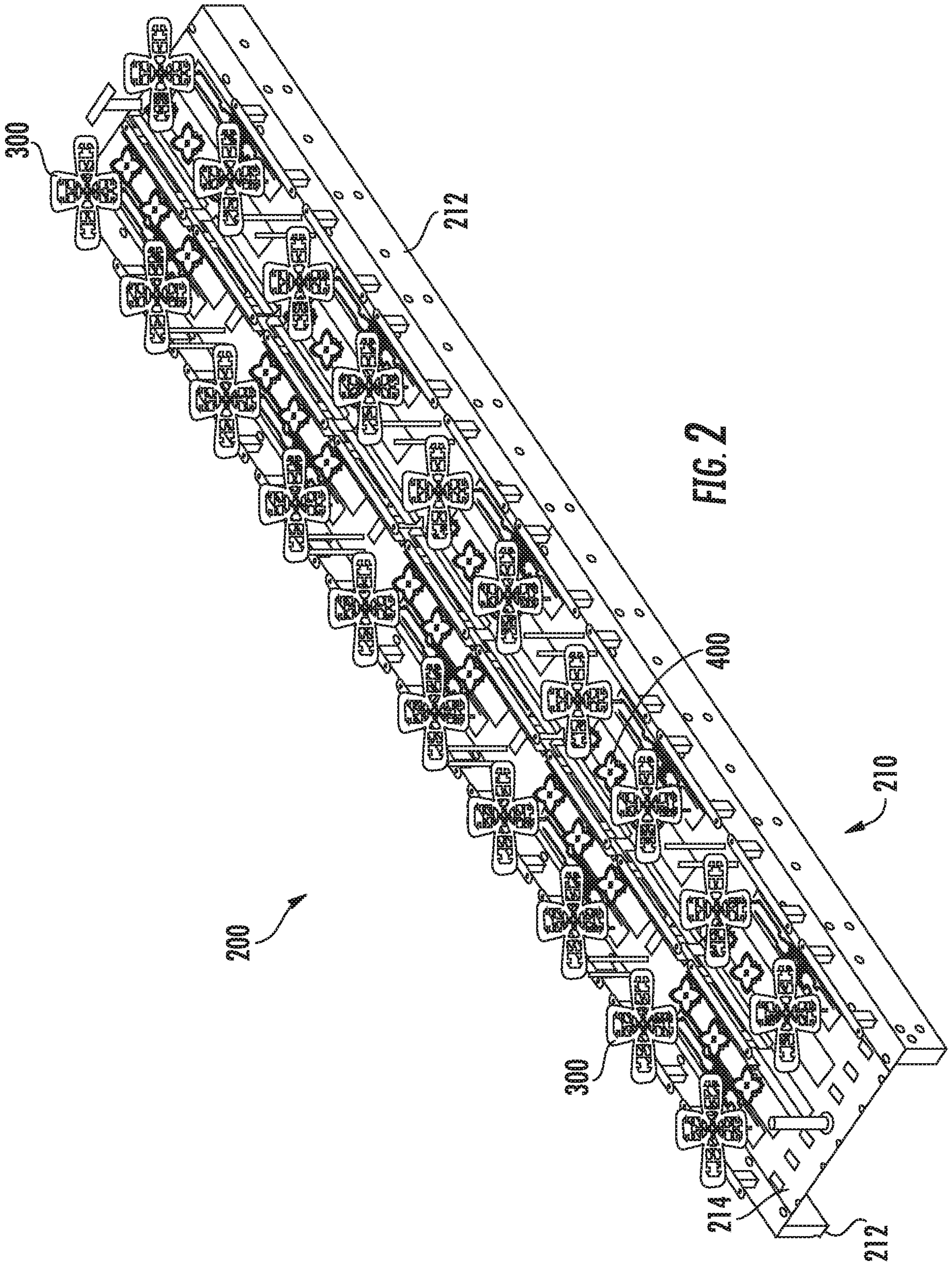
FIG. 2 is a perspective view of a base station antenna of FIG. 1 with the radome removed.
Figure 3:
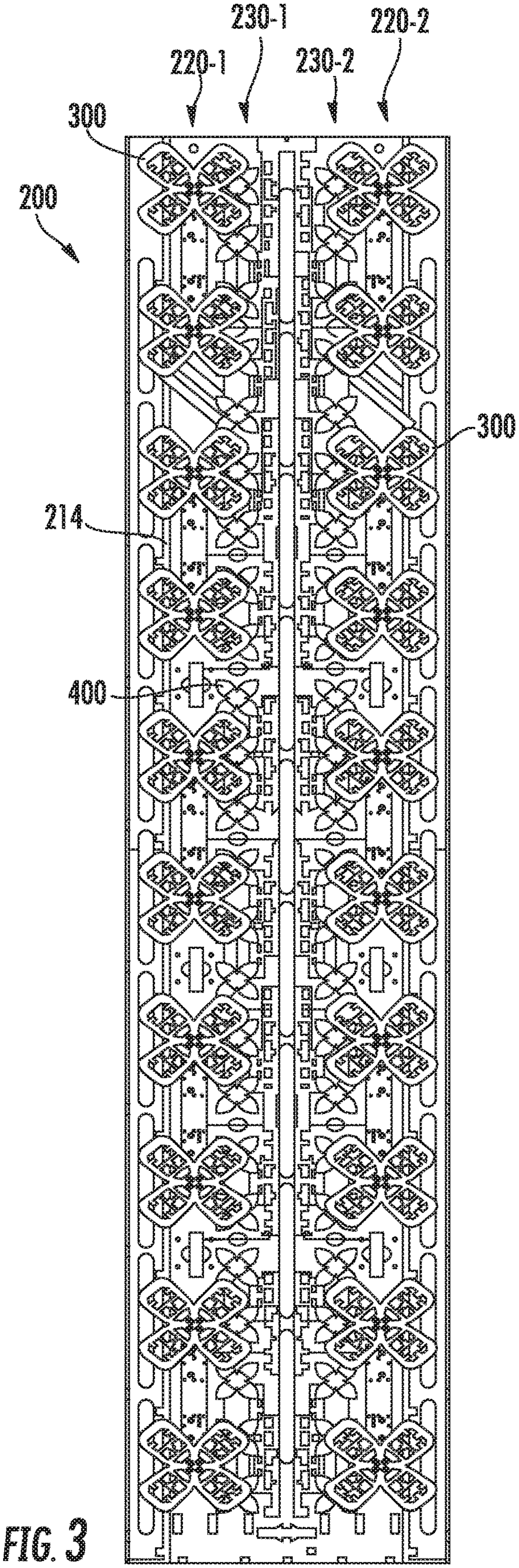
FIG. 3 is a front view of a base station antenna of FIG. 1 with the radome removed.
Figure 4:
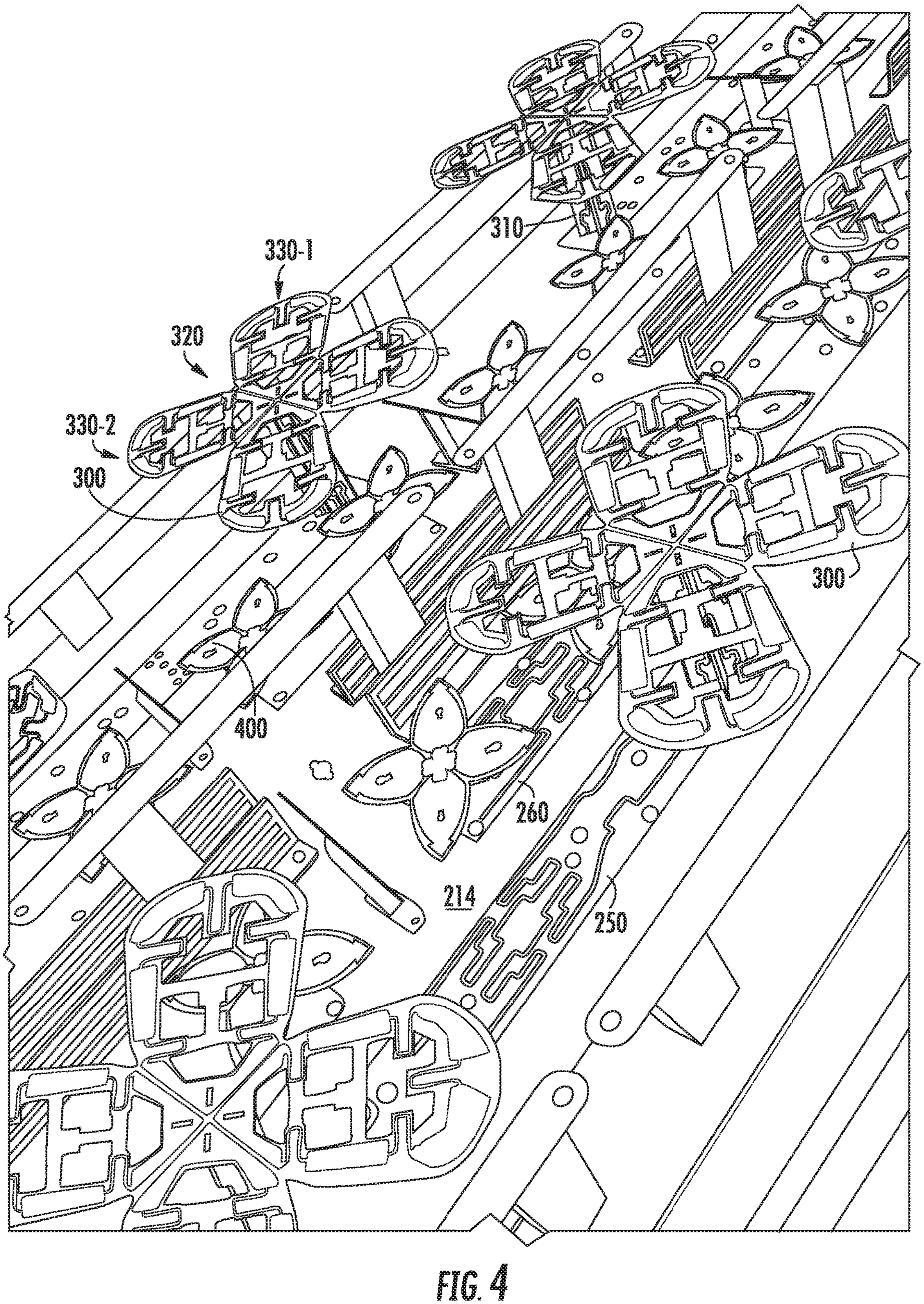
FIG. 4 is an enlarged partial perspective front view of the base station antenna of FIGS. 1-3.

FIGS. 1-4 illustrate a base station antenna 100 that includes radiating elements having sheet metal-on-dielectric dipole radiators according to certain embodiments of the present invention. FIG. 1 is a front perspective view of the base station antenna 100, while FIGS. 2 and 3 are a perspective view and a front view, respectively, of the antenna 100 with the radome thereof removed to illustrate the inner components of the antenna. FIG. 4 is an enlarged partial perspective view of the base station antenna 100 with the radome thereof removed.

As shown in FIGS. 1-4, the base station antenna 100 is an elongated structure that extends along a longitudinal axis L. The antenna 100 is typically mounted in a vertical orientation (i.e., the longitudinal axis L may be generally perpendicular to a plane defined by the horizon when the antenna 100 is mounted for use). In the description that follows, the antenna 100 and sub-components thereof will be described using terms that assume that the antenna 100 is mounted for use on a tower with the longitudinal axis L of the antenna 100 extending along a generally vertical axis and the front surface of the antenna 100 mounted opposite the tower pointing toward the coverage area for the antenna 100.

Referring to FIG. 1, the base station antenna 100 may have a tubular shape with a generally rectangular cross-section. The antenna 100 includes a radome 110 and a top end cap 120. One or more mounting brackets 150 are provided on the rear side of the radome 110 which may be used to mount the antenna 100 onto an antenna mount (not shown) on, for example, an antenna tower. The antenna 100 also includes a bottom end cap 130 which includes a plurality of connectors 140 mounted therein.

As shown in FIGS. 2-3, the base station antenna 100 includes an antenna assembly 200 that may be slidably inserted into the radome 110. The antenna assembly 200 includes a ground plane structure 210 that has sidewalls 212 and a reflector 214. The reflector 214 may comprise a metallic surface that serves as a reflector and ground plane for the radiating elements of the antenna 100. A plurality of radiating elements 300, 400 are mounted to extend forwardly from the reflector 214. The radiating elements include low-band radiating elements 300 and high-band radiating elements 400. As shown best in FIG. 3, the low-band radiating elements 300 are mounted in two vertical columns to form two vertically-disposed linear arrays 220-1, 220-2 of low-band radiating elements 300. The high-band radiating elements 400 may also be mounted in two vertical columns to form two vertically-disposed linear arrays 230-1, 230-2 of high-band radiating elements 400. The low-band radiating elements 300 may be configured to transmit and receive signals in a first frequency band such as, for example, the 694-960 MHz frequency range or a portion thereof. The high-band radiating elements 400 may be configured to transmit and receive signals in a second frequency band such as, for example, the 1695-2690 MHz frequency range or a portion thereof.

FIG. 4 is an enlarged partial perspective view of the base station antenna 100 with the radome 110 removed. As can be seen in FIG. 4, each low-band linear array 220 may include a plurality of low-band radiating element feed assemblies 250, each of which includes two low-band radiating elements 300. Each high-band linear array 230 may include a plurality of high-band radiating element feed assemblies 260, each of which includes one to three high-band radiating elements 400. The low-band and high-band radiating elements 300, 400 are located in very close proximity to each other. The low-band radiating elements 300 and the high-band radiating elements are mounted to extend forwardly from the ground plane structure 210, with the low-band radiating elements 300 extending farther forwardly than the high-band radiating elements 400.

Figure 5:
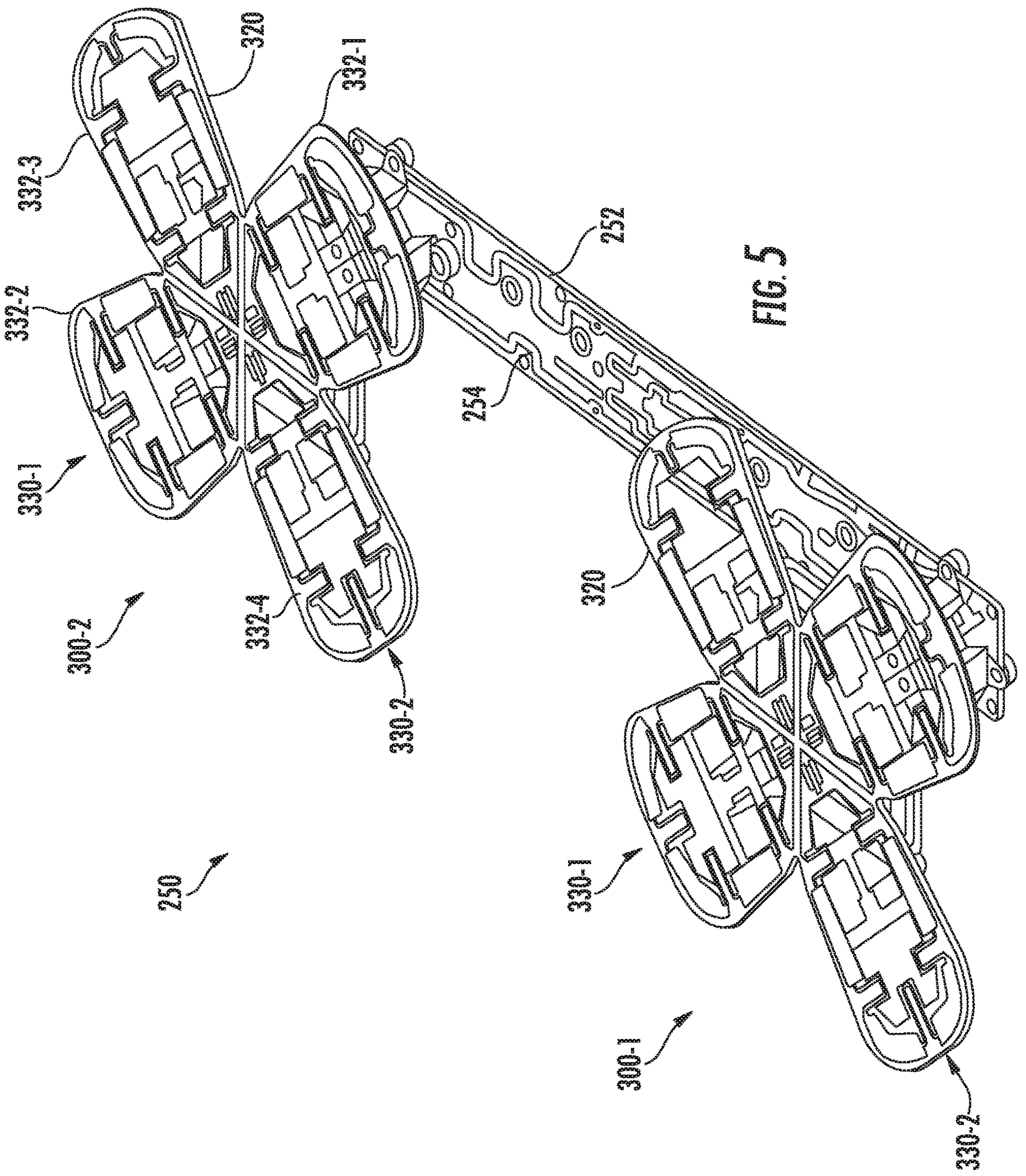
FIG. 5 is an enlarged perspective view of one of the low-band radiating element assemblies of the base station antenna of FIGS. 1-4.
Figure 6:
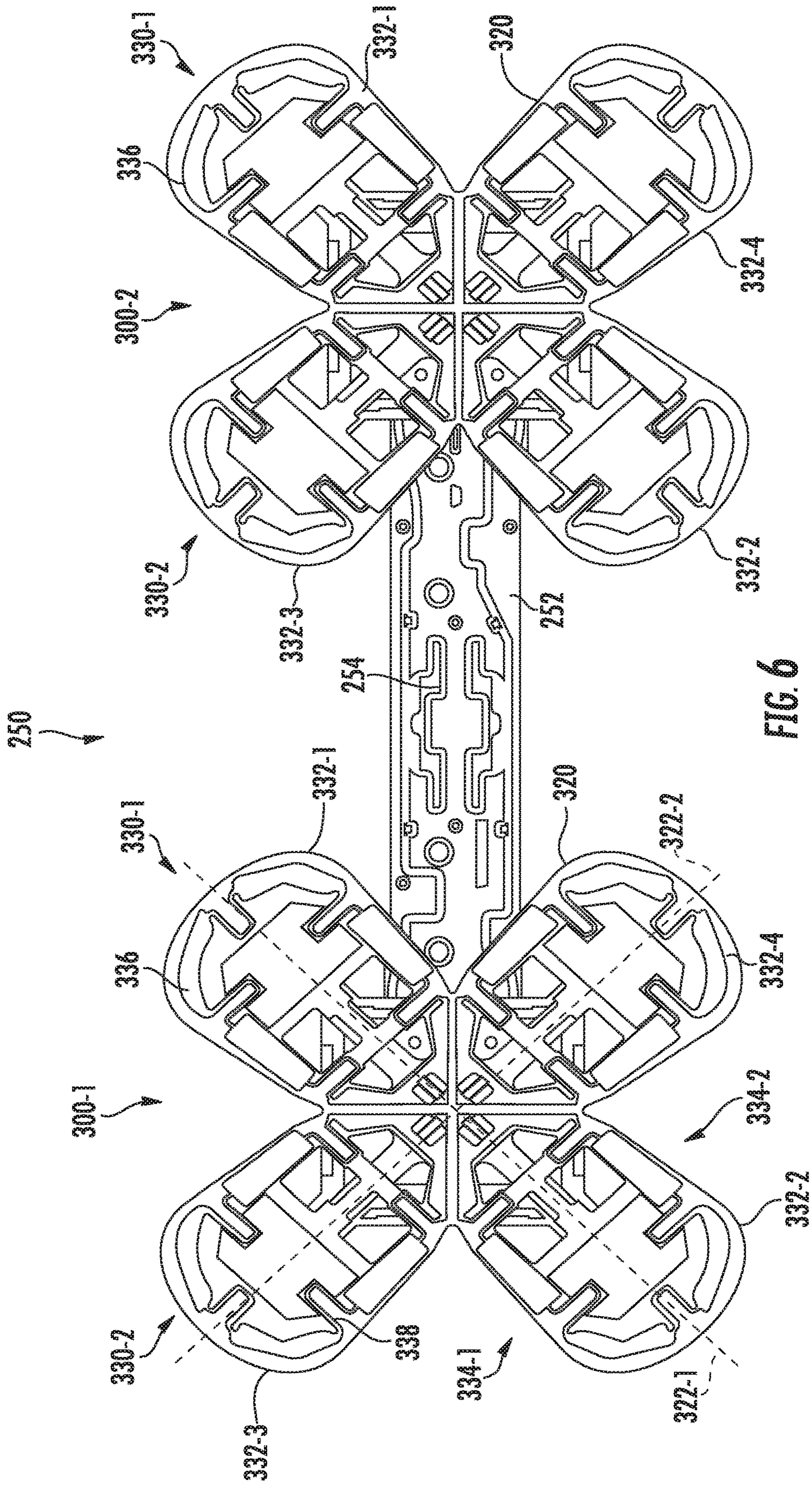
FIG. 6 is a front view of the low-band radiating element assembly of FIG. 5.
Figure 7:
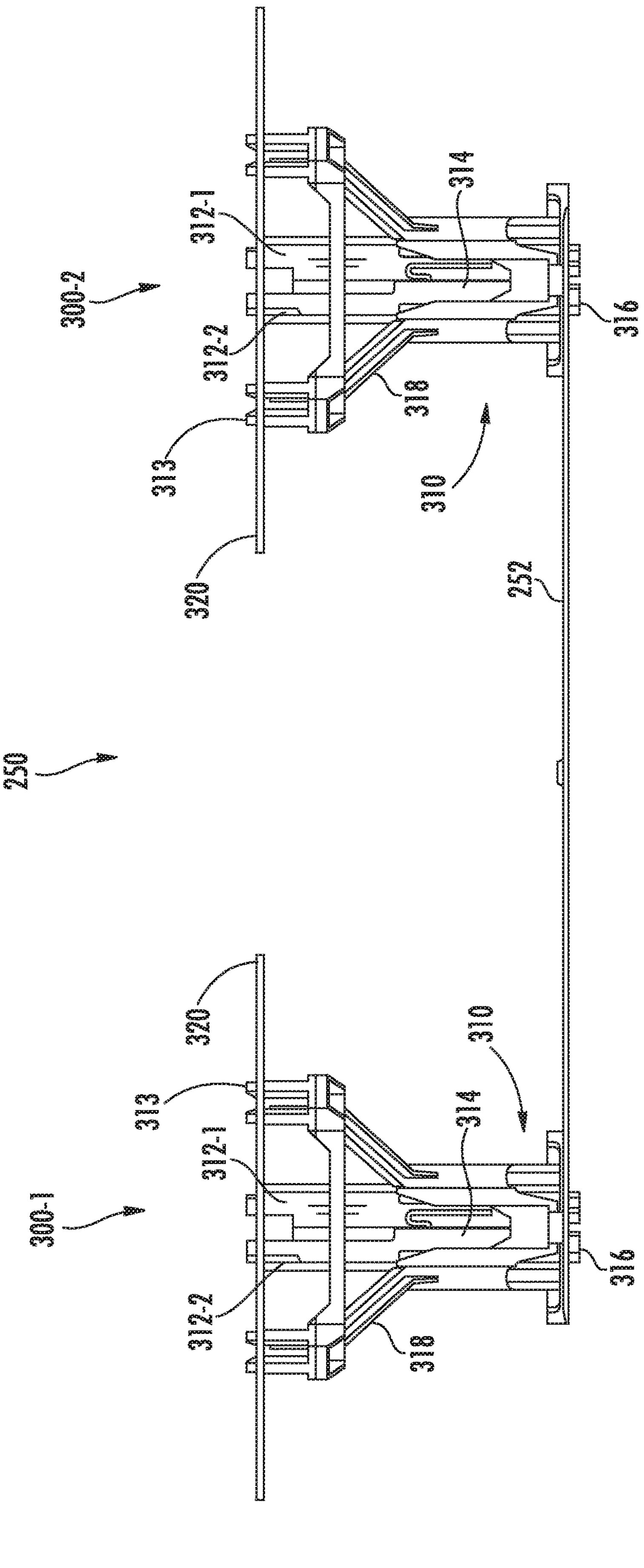
FIG. 7 is a side view of the low-band radiating element assembly of FIG. 5.

FIGS. 5-7 are a perspective view, a front view and a side view, respectively, of one of the low-band radiating element assemblies 250 included in the base station antenna 100. The low-band feed board assembly 250 includes a printed circuit board 252 that has first and second low-band radiating elements 300-1, 300-2 extending forwardly from either end thereof. The printed circuit board 252 includes RF transmission line feeds 254 that provide RF signals to, and receive RF signals from, the respective low-band radiating elements 300-1, 300-2. Each low-band radiating element 300 includes a feed stalk 310 and a cross-dipole radiator 320 that is mounted on the forward end of the feed stalk 310.

Each feed stalk 310 may comprise a pair of printed circuit boards 312-1, 312-2 that have RF transmission lines 314 formed thereon. These RF transmission lines 314 carry RF signals between the printed circuit board 252 and the cross-dipole radiators 320. A first of the printed circuit boards 312-1 may include a lower vertical slit and the second of the printed circuit boards 312-2 includes an upper vertical slit. These vertical slits allow the printed circuit boards 312 to be assembled together to form a vertically-extending column that has generally x-shaped cross-section. Lower portions of each printed circuit board 312 may include plated projections 316. These plated projections 316 are inserted through slits in the printed circuit board 252. The plated projections 316 of printed circuit board 312 may be soldered to plated portions on printed circuit board 252 to electrically connect the printed circuit boards 312 to the printed circuit board 252. The RF transmission lines 314 on the respective feed stalks 310 may feed the RF signals to the cross-dipole radiators 320. Dipole supports 318 may also be provided to hold the cross-dipole radiators 320 in their proper positions.

Figure 8A:
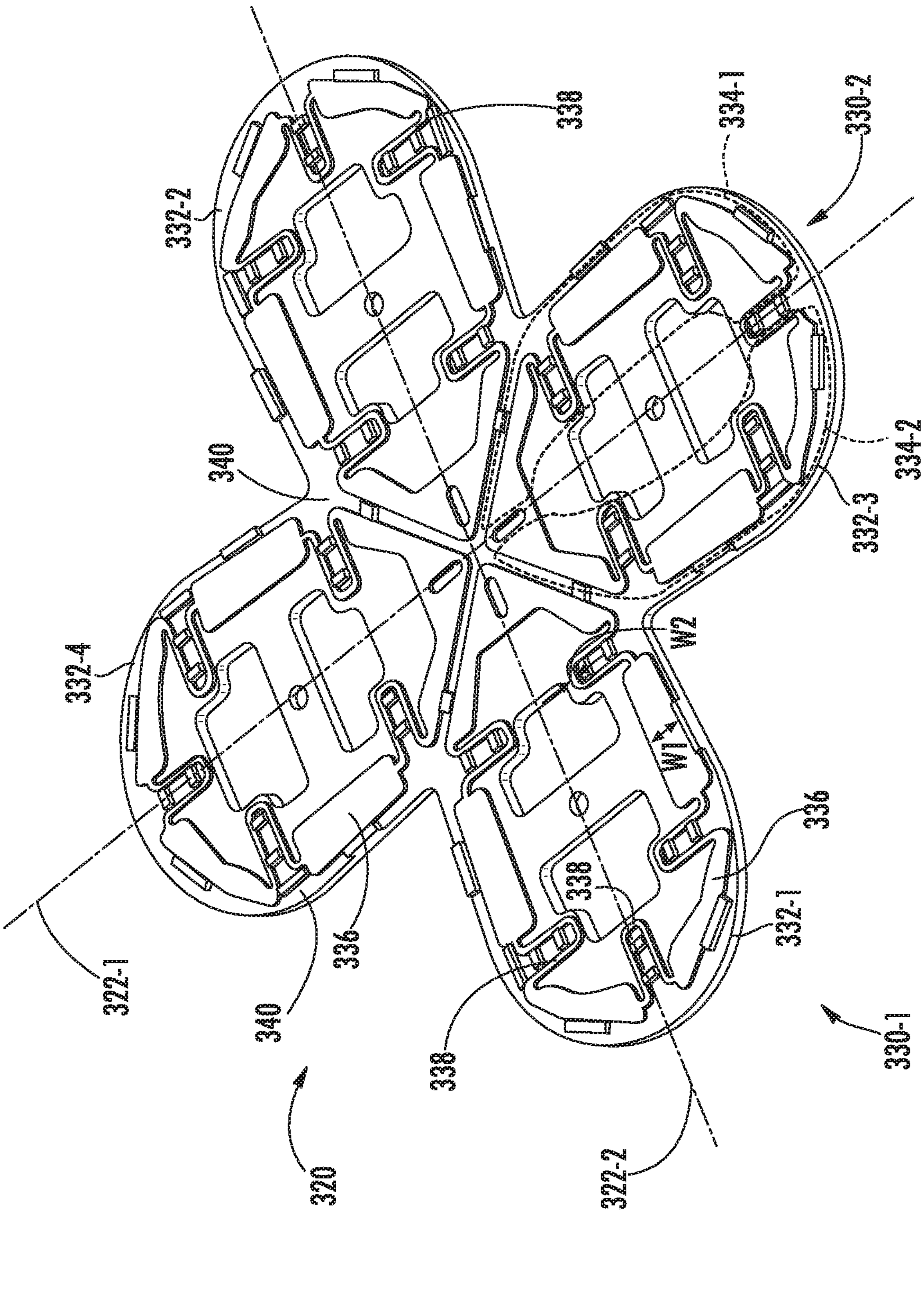
FIGS. 8A and 8B are a perspective view and an exploded perspective view, respectively, of the cross-dipole radiator of one of the low-band radiating elements included in the low-band radiating element assembly of FIGS. 5-7.
Figure 8B:
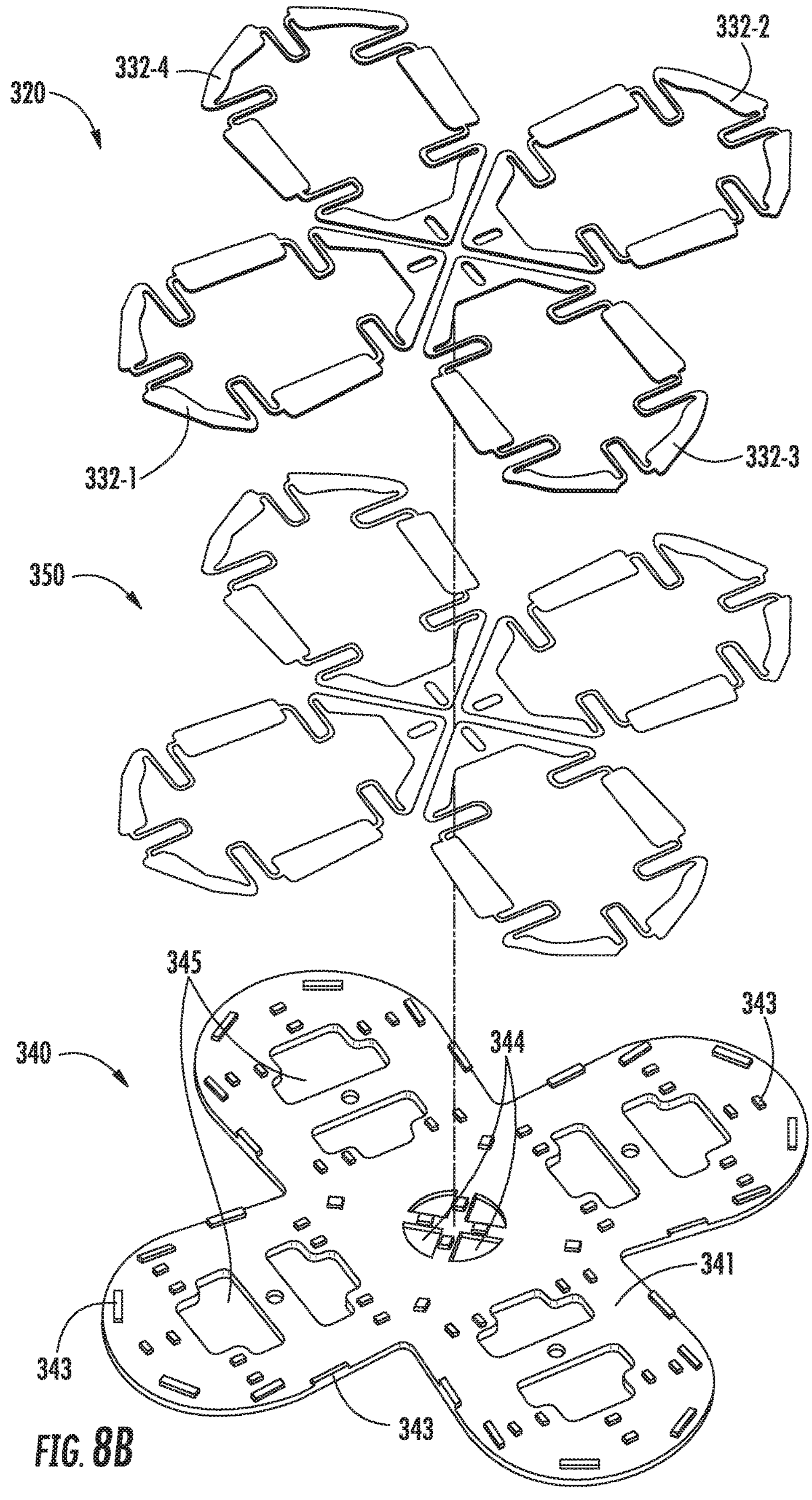
Figure 9A:
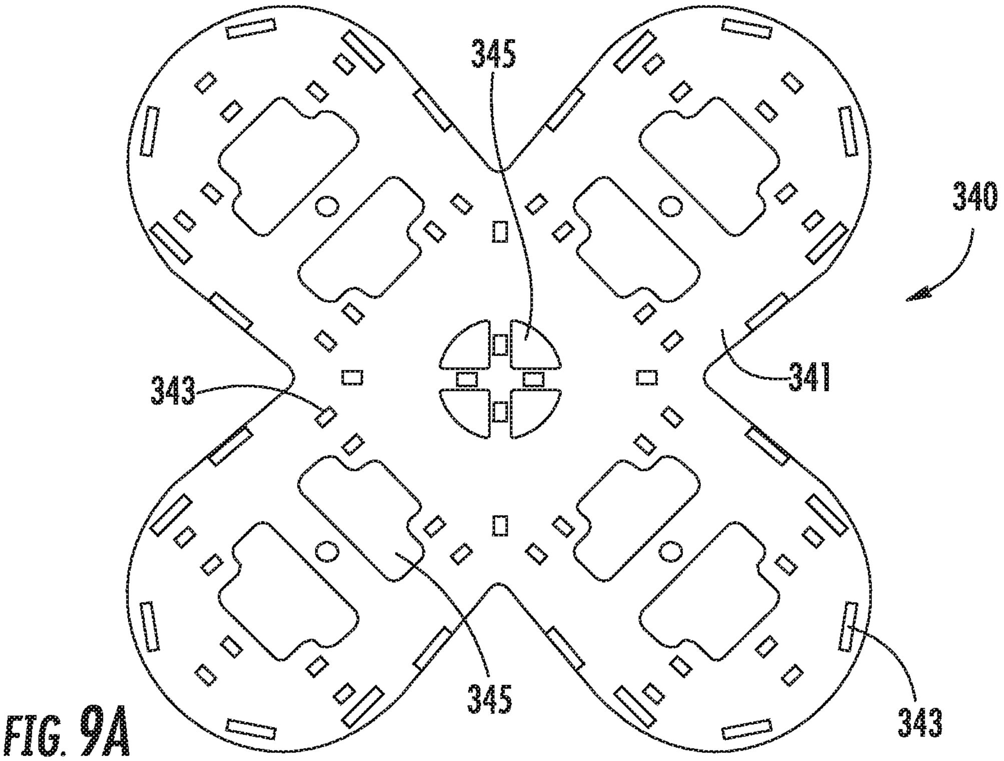
FIGS. 9A-9B are a front view and a rear view, respectively, of the dielectric mounting substrate of the cross-dipole radiator of FIGS. 8A-8B.
Figure 9B:
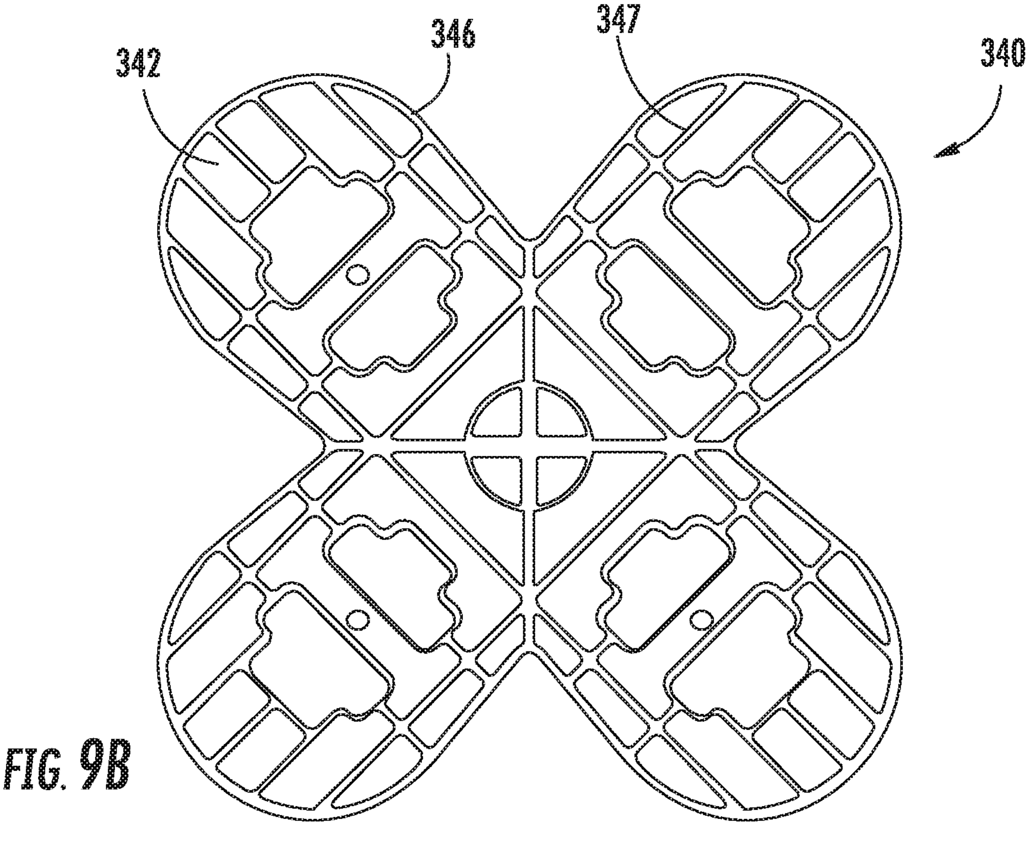

FIGS. 8A-9B illustrate the cross-dipole radiator 320 of one of the radiating elements 300 of low-band feed assembly 300 in greater detail. FIGS. 8A and 8B are a perspective view and an exploded perspective view, respectively, of the cross-dipole radiator 320. FIGS. 9A-9B are a front view and a rear view of a dielectric mounting substrate 340 of the cross-dipole radiator 320 of FIGS. 8A-8B.

The cross-dipole radiator 320 includes first and second metal dipoles 330-1, 320-2. The first metal dipole 330-1 includes first and second dipole arms 332-1, 332-2, and the second metal dipole 330-2 includes third and fourth dipole arms 332-3, 332-4. All four dipole arms 332 are mounted on the dielectric mounting substrate 340. Each metal dipole 330 may, for example, have two dipole arms 332 that are between 0.2 to 0.35 of an operating wavelength in length, where the "operating wavelength" refers to the wavelength corresponding to the center frequency of the operating frequency band of the radiating element 300. For example, if the low-band radiating elements 300 are designed as wideband radiating elements that are used to transmit and receive signals across the full 694-960 MHz frequency band, then the center frequency of the operating frequency band would be 827 MHz and the corresponding operating wavelength would be 36.25 cm.

As shown in FIG. 8A, the first metal dipole 330-1 extends along a first axis 322-1 and the second metal dipole 330-2 extends along a second axis 322-2 that is generally perpendicular to the first axis 322-1. The dipole arms 332-1 and 332-2 that form the first metal dipole 330-1 are center-fed by a common RF transmission line 314 and together directly radiate at a +45 degree polarization. Dipole arms 332-3 and 332-4 of the second metal dipole 330-2 are likewise center fed by a common RF transmission line 314 and together directly radiate at a −45 degree polarization. The dipole arms 332 may be soldered to the feed stalk 310 so that the first and second metal dipoles 330-1, 330-2 are fed via direct ohmic connections between the transmission lines 314 and the dipole arms 332. The dipole supports 318 may reduce the forces applied to the solder joints that electrically connect the transmission lines 314 to the dipole arms 332. The dipole arms 332 may be mounted approximately 3/16 to 1/4 of an operating wavelength in front of the reflector 214 by the feed stalks 310. The reflector 214 may be immediately behind the feed board printed circuit board 252.

Each dipole arm 332 includes first and second spaced-apart conductive segments 334-1, 334-2 that together form a generally oval shape. In the depicted embodiment, all four dipole arms 332 lie in a common plane that is generally parallel to a plane defined by the underlying reflector 214. Each feed stalk 310 may extend in a direction that is generally perpendicular to the plane defined by the dipole arms 332. Each conductive segment 334-1, 334-2 may comprise a metal pattern that has a plurality of widened segments 336 and at least one narrowed trace section 338. The narrowed trace sections 338 may be implemented as non-linear conductive traces that follow a meandered path to increase the path length thereof. The first conductive segment 334-1 may form half of the generally oval shape and the second conductive segment 334-2 may form the other half of the generally oval shape. The dipole arms 330 may have shapes other than a generally oval shape, such as, for example, an elongated generally rectangular shape.

As shown in FIG. 8A, each widened section 336 of the conductive segments 334-1, 334-2 may have a respective width $W_1$. The narrowed trace sections 338 may similarly have a respective width $W_2$. The widths $W_1$ and $W_2$ are measured in a direction that is generally perpendicular to the direction of instantaneous current flow along the respective sections 336, 338. The respective widths $W_1$ and $W_2$ of each widened section 336 and each narrowed trace section 338 need not be constant, and hence in some instances reference will be made to the average widths of the widened sections 336 and the narrowed trace sections 338. The average width of each widened section 336 may be, for example, at least twice the average width of each narrowed trace section 338 in some embodiments. In other embodiments, the average width of each widened section 336 may be at least three, four or five times the average width of each narrowed trace section 338.

When the high-band radiating elements 400 transmit and receive signals, the high-band RF signals may tend to induce currents on the dipole arms 332 of the low-band radiating elements 300. This can particularly be true when the low-band and high-band radiating elements 300, 400 are designed to operate in frequency bands having center frequencies that are separated by about a factor of two, as a low-band dipole arm 332 having a length that is about a quarter wavelength of the low-band operating frequency will, in that case, have a length of approximately a half wavelength of the high-band operating frequency. The greater the extent that high-band currents are induced on the low-band dipole arms 332, the greater the impact on the characteristics of the radiation pattern of the linear arrays 230 of high-band radiating elements 400.

The narrowed trace sections 338 may act as high impedance sections that interrupt currents in the high-band frequency range that could otherwise be induced on the low-band dipole arms 332. The narrowed trace sections 338 may create this high impedance for high-band currents without significantly impacting the flow of the low-band currents on the dipole arms 332. As such, the narrowed trace sections 338 may reduce induced high-band currents on the low-band radiating elements 300 and consequent disturbance to the antenna pattern of the high-band linear arrays 230. In some embodiments, the narrowed trace sections 338 may make the low-band radiating elements 300 almost invisible to the high-band radiating elements 400, and thus the low-band radiating elements 300 may not distort the high-band antenna patterns.

As can further be seen in FIGS. 8A and 8B, the distal ends of the conductive segments 334-1, 334-2 may be electrically connected to each other so that the conductive segments 334-1, 334-2 form a closed loop structure. In the depicted embodiment, some of the conductive segments 334-1, 334-2 are electrically connected to each other by a narrowed trace section 338, while in other embodiments the widened sections 336 at the distal ends of conductive segments 334-1, 334-2 may merge together. In still other embodiments, different electrical connections may be used, or the distal ends of the conductive segments 334-1, 334-2 may not be physically connected to each other. As can also be seen, the interior of the loop defined by the conductive segments 334-1, 334-2 (which may or may not be a closed loop) may be generally free of conductive material. Additionally, at least some of the dielectric mounting substrate 340 on which the conductive segments 334-1, 334-2 are mounted may be omitted in the interior of the loop. Some of the dielectric of mounting substrate 340 may be left in the interior of the loops to provide structural support and/or to provide locations for attaching the dipole support structure 318 to each dipole arm 332.

By forming each dipole arm 332 as first and second spaced-apart conductive segments 334-1, 334-2, the currents that flow on the dipole arm 332 may be forced along two relatively narrow paths that are spaced apart from each other. This approach may provide better control over the radiation pattern. Additionally, by using the loop structure, the overall length of the dipole arms 332 may be reduced, allowing greater separation between each dipole arm 332 and other radiating elements 300, 400.

In some embodiments, the first and second metal dipoles 330-1, 330-2 may have "unbalanced" dipole arms 332 that have different shapes or sizes. The use of unbalanced dipole arms 332 may help correct for unbalanced current flow that may otherwise occur in radiating elements 300 that are located along the outer edges of a reflector 214. Such unbalanced current flow may occur because the inner dipole arms 332 on radiating elements 300 that are positioned close to the side edges of the reflector may "see" more of the ground plane 214 than the outer dipole arms 332. This may cause an imbalance in current flow, which may negatively affect the patterns of the low-band antenna beams. This imbalance may be reduced, for example, by including more metal along the distal edges of the outer dipole arms 332 that are adjacent the edge of the ground plane 214.

In some embodiments, capacitors may be formed between adjacent dipole arms 332 of different metal dipoles 330. For example, a first capacitor may be formed between dipole arms 332-1 and 332-3 and a second capacitor may be formed between dipole arms 332-2 and 332-4. These capacitors may be used to tune (improve) the return loss performance and/or antenna pattern for the low-band metal dipoles 330-1, 330-2. In some embodiments, the capacitors may be formed on the feed stalks 310.

As discussed above, pursuant to embodiments of the present invention, the dipole radiators 320 may be implemented by forming sheet metal in the desired shape for each dipole arm 332 and then adhering the dipole arms 332 to a dielectric mounting substrate 340. FIGS. 8B and 9A-9B illustrate this implementation in greater detail. The dipole arms 332 may be formed, for example, by stamping, laser cutting, wire electrical discharge machining (EDM) cutting, machining or other high volume production processes.

Turning first to FIG. 8B, an exploded perspective view of the cross-dipole radiator 320 is illustrated. As shown in FIG. 8B, the four dipole arms 332 may be separately stamped from a sheet of metal such as a thin sheet of copper or aluminum. The dipole arms 332 may be manufactured cheaply and easily by this technique, and the metal that is cut away during the stamping operation may be recycled to reduce costs. The sheet metal may have a desired thickness for the thickness of the dipole arms 332. This thickness may be selected based on a variety of considerations, including cost, weight, the impedance match of the dipole arms 332 to respective transmission lines 314 on the feed stalk 310 and/or signal loss for currents flowing along the dipole arms 332. Typically, cost and weight considerations may favor reduced thicknesses for the dipole arms 332, while impedance match and signal loss considerations tend to favor increased thickness. In some embodiments, the dipole arms 332 may have a thickness that is between five and forty-five times the thickness of the metal layers on conventional printed circuit boards. For example, the sheet metal may have a thickness between 200 and 1800 microns in some embodiments. These increased thicknesses for the metal dipole arms 332 may provide improved RF performance.

The sheet metal that is used to from the dipole arms 332 may have very smooth major surfaces, either as manufactured or because a polishing or another smoothing operation is performed thereon. It is believed that roughness in the metal surface may be a source of PIM distortion. As know to those of skill in the art, PIM distortion is a form of electrical interference that may occur when two or more RF signals encounter non-linear electrical junctions or materials along an RF transmission path. Rough metal surfaces along an RF transmission path are one potential source for PIM distortion, particularly when such rough surfaces are in high current density regions of the RF transmission path. The non-linearities that arise may act like a mixer causing new RF signals to be generated at mathematical combinations of the original RF signals. If the newly generated RF signals fall within the bandwidth of the radio receiver, the noise level experienced by the receiver is effectively increased. When the noise level is increased, it may be necessary reduce the data rate and/or the quality of service. By using sheet metal having very smooth surfaces to form the dipole arms 332, the risk of PIM distortion arising in the dipole arms 332 may be significantly reduced.

As is further shown in FIG. 8B, the metal dipole arms 332 may be attached to the dielectric substrate 340 using an adhesive 350. The adhesive 350 may be coated onto one or both of the metal dipole arms 332 or the dielectric mounting substrate 340. In some embodiments, the adhesive 350 may be double liner adhesive transfer tape. It will also be appreciated that the metal dipole arms 332 may be attached to the dielectric mounting substrate 340 via other attachment mechanisms. For example, in other embodiments, the metal dipole arms 332 may be attached to the dielectric mounting substrate 340 by over-molding the dielectric mounting substrate 340 onto the metal dipole arms 332. In still other embodiments, the metal dipole arms 332 may be attached to the dielectric mounting substrate 340 via ultrasonic welding. As another example, the metal dipole arms 332 may be attached to the dielectric mounting substrate 340 using a heat stake system that is used to partially melt and deform the dielectric substrate to join the metal dipole arms 332 thereto. The metal dipole arms 332 may also be attached to the dielectric mounting substrate 340 as a sheet metal laminate. In still other embodiments, mechanical fasteners such as screws, rivets or the like may be used. Attachment mechanisms other than the example mechanisms discussed above may be used. Thus, it will be appreciated that the metal dipole arms 332 may be attached to the dielectric mounting substrate 340 in a wide variety of different attachment mechanisms.

Referring to FIGS. 8A and 9A-9B, the dielectric mounting substrate 340 may be formed of plastic or another relatively rigid, inexpensive, dielectric material. The dielectric mounting substrate 340 may be a generally planar sheet of material in some embodiments having a front surface 341 and a rear surface 342. Referring to FIGS. 8A-8B and 9A, a plurality of guides 343 in the form of raised nubs may be provided on the front surface 341. As can be seen best in FIG. 8A, the guides 343 may facilitate maintaining the dipole arms 332 in their proper positions on the dielectric mounting substrate 340. Guides 343 may be provided in center portions of the narrow meandered trace sections 338, between and/or along edges of the widened sections 336 and/or between adjacent dipole arms 332.

The dielectric mounting substrate 340 may include four central openings 344 that receive respective ones of extensions 313 (see FIG. 7) on the forward ends of the printed circuit boards 312-1, 312-2. A respective RF transmission line 314 may extend onto each extension 313, and solder joints may be formed between the respective extensions 313 and the cross-dipole radiator 320 that physically connect the cross-dipole radiator 320 to the feed stalk 310 while electrically connecting a transmission line 314 to each respective dipole arm 332. One or more openings 345 may be provided in an interior portion of the dielectric mounting substrate 340 where the dielectric material is removed/omitted. In some embodiments, these openings 345 may be within the interior of the loops defined by the respective dipole arms 332. Generally speaking, the dielectric material may negatively impact the RF performance of the low-band radiating elements 300. The greater the amount of dielectric material used also tends to increase the impact that the low-band radiating element 300 has on the radiation patterns of adjacent high-band radiating elements 400. Accordingly, the amount of dielectric material may be kept as low as possible in some embodiments. Removing dielectric material in the interior of the loops formed in the respective dipole arms 332 may provide one convenient way of reducing the amount of dielectric material in the dielectric mounting support 340.

Referring to FIG. 9B, the rear surface 342 of dielectric mounting substrate 340 may include a rearwardly-extending lip 346 that extends part or all of the way around the periphery of the rear surface 342. The lip 346 may provide increased structural integrity, allowing the thickness of the remainder of the dielectric mounting substrate 340 to be reduced. Likewise, support ribs 347 may be provided on the rear surface 342 of the dielectric mounting substrate 340 to provide additional structural rigidity. The ribs 344 may be primarily provided underneath the dipole arms 332.

The dielectric mounting substrate 340 may be formed by any appropriate process including, for example, injection molding, other forms of molding, cutting, stamping or the like. Injection molding may be preferred in embodiments that include lips 346 and/or ribs 347. The dielectric mounting substrate 340 may typically comprise a single piece of dielectric material that all four dipole arms 332 are adhered to, although multi-piece dielectric mounting substrates may be used in some embodiments.

While FIGS. 8A-9B illustrate a cross-dipole radiator 320 that has the dipole arms 332 formed on the front surface 341 of the dielectric mounting support 340, embodiments of the present invention are not limited thereto. For example, in other embodiments, the dipole arms 332 may be adhered to the rear surface 342 of the dielectric mounting substrate 340 via the adhesive 350.

Figure 10:
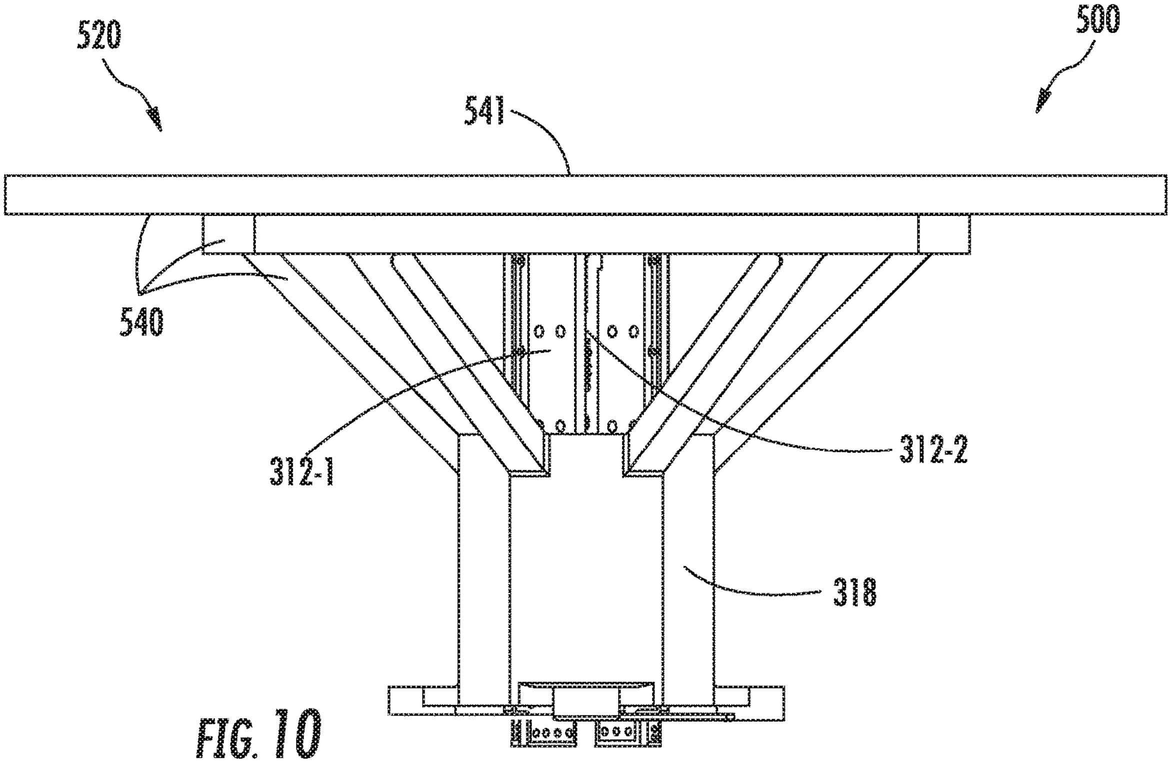
FIG. 10 is a side view of a dielectric mounting support for a cross-dipole radiator according to further embodiments of the present invention.

Pursuant to further embodiments of the present invention, radiating elements are provided which include both a dielectric mounting substrate and a dipole support that are integrated as a single monolithic dielectric mounting substrate and dipole support structure. FIG. 10 illustrates one example implementation of a radiating element 500 that includes such a monolithic dielectric mounting substrate and dipole support structure 540. The monolithic dielectric mounting substrate and dipole support structure 540 may replace the dielectric mounting substrate 340 and dipole support 318 of the radiating element 300 described above. The dielectric mounting substrate and dipole support structure 540 can be formed, for example, by injection molding. As described above with reference to FIGS. 8A-9B, stamped metal dipole arms 332 (not visible in FIG. 10) may be formed and adhered to the front surface 541 of the dielectric mounting substrate and dipole support structure 540. Use of a monolithic dielectric mounting substrate and dipole support structure 540 may be advantageous as it reduces assembly time and provides a more stable and stronger connection between the support structure and the cross-dipole radiator 520. This may reduce vibrational movement of the cross-dipole radiator 520 and/or allow for a less substantial dipole support. Aside from replacing the dielectric mounting substrate 340 and dipole support 318 of radiating element 300 with a monolithic dielectric mounting substrate and dipole support structure 540, radiating element 500 may be identical to radiating element 300 and hence further description thereof will be omitted.

Pursuant to still further embodiments of the present invention, radiating elements are provided that have three-dimensional cross-dipole radiators 620. Such three-dimensional cross-dipole radiators 620 may readily be formed by bending the stamped metal dipole arms 332 (to form dipole arms 632) and by forming three-dimensional dielectric mounting substrates 640 via, for example, injection molding. The use of such three-dimensional cross-dipole radiators 620 may be advantageous for reducing the overall footprint of the cross-dipole radiator 620 when viewed from the front of the base station antenna, which may increase the distance between adjacent radiating elements (thereby improving isolation), allow for a reduction in the size of the base station antenna, and/or provide room for additional radiating elements.

Figure 11:
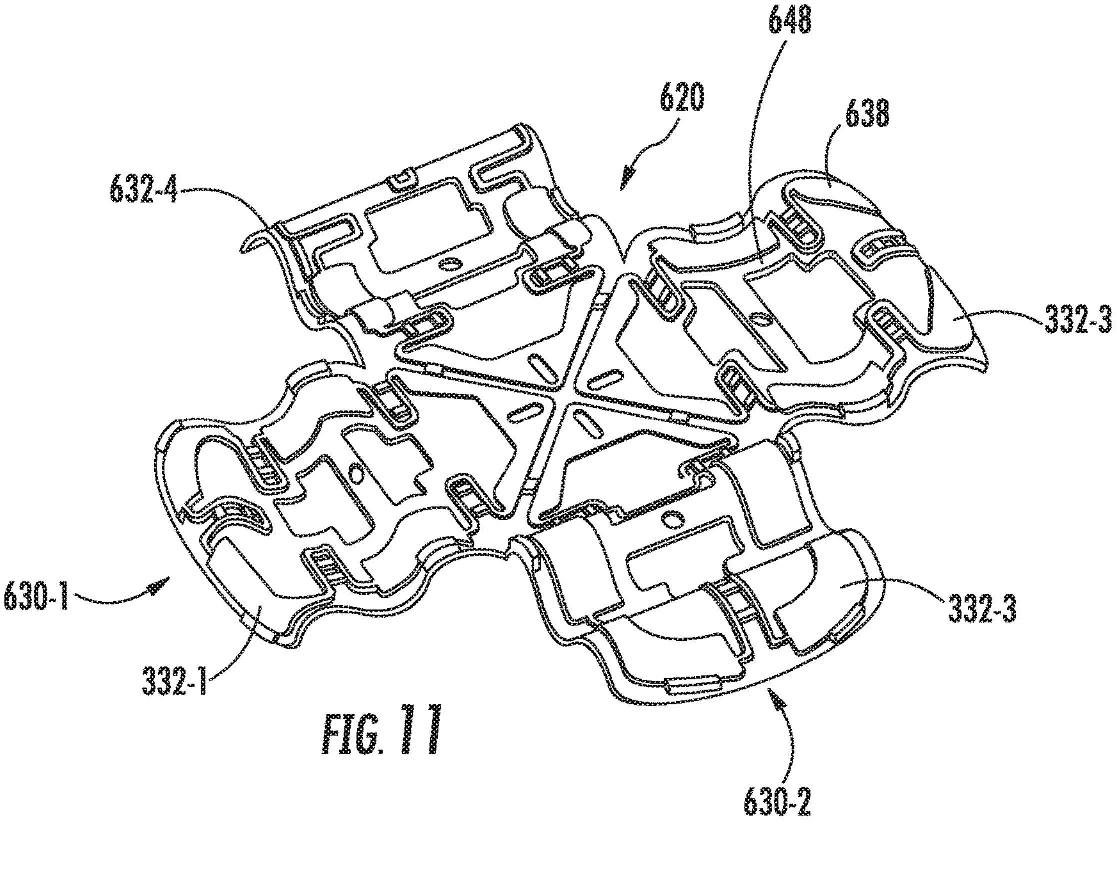
FIG. 11 is a perspective view of a three-dimensional cross-dipole radiator according to embodiments of the present invention.

FIG. 11 is a side front perspective view of a cross-dipole radiator 620 that has such a three-dimensional shape. As shown in FIG. 11, the cross-dipole radiator 620 may be similar to the cross-dipole radiator 320 that is discussed above, and may include four dipole arms 632-1 through 632-4 that are adhered to a dielectric mounting substrate 640. The dipole arms 632 may be identical to the dipole arms 332 except that the dipole arms 632 are bent to have a plurality of wave-like undulations 638. Likewise, the dielectric mounting substrate 640 may be identical to the dielectric substrate 340 except that the dielectric mounting substrate 640 may include a plurality of wave-like undulations 648. The undulations 638 may be spaced apart from each other along the longitudinal axis of the respective dipole arms. Consequently, the undulations 638 in dipole arms 632-1 and 632-2 may be spaced apart from each other in a first direction and the undulations 638 in dipole arms 632-3 and 632-4 may be spaced apart from each other in a second direction that is different than the first direction. The undulations 638 may conform to the undulations 648 so that the dipole arms 632 may be readily adhered to the dielectric mounting substrate 640 and may be a substantially constant distance from the dielectric mounting substrate 640.

Forming the dipole arms 632 and the dielectric mounting substrate 640 to include the undulations 638, 648 acts to reduce the physical "footprint" of the cross-dipole radiator 620. Herein, the footprint of a dipole (or cross-dipole) radiator refers to the area of the reflector that the dipole radiator "covers" when the dipole radiator is viewed from the front along a central axis of the feed stalk that the dipole radiator is mounted on. Typically, the length of each metal dipole (and hence the lengths of the dipole arms that may form the metal dipole) is set based on desired RF radiating characteristics for the radiating element. By bending the dipole arms 632 of cross-dipole radiator 620 to include one or more undulations 638, the footprint of cross-dipole radiator 620 may be reduced without effecting the length of the metal dipoles 630 thereof. Such three-dimensional cross-dipole radiators cannot readily be formed using printed circuit board technology, since conventional printed circuit board are planar structures. Moreover, while flexible printed circuit boards are known in the art, the metal layers on such flexible printed circuit boards typically are very thin and generally unsuitable for use as a dipole radiator of a base station antenna.

In the embodiment of FIG. 11, the undulations 638, 648 are curved undulations having a generally sinusoidal shape. It will be appreciated that the shape, frequency and magnitude (i.e., peak to trough distance) of the undulations 638, 648 may be varied. It will also be appreciated that only portions of each dipole arm 632 may include undulations 638 in some embodiments.

Figure 12:
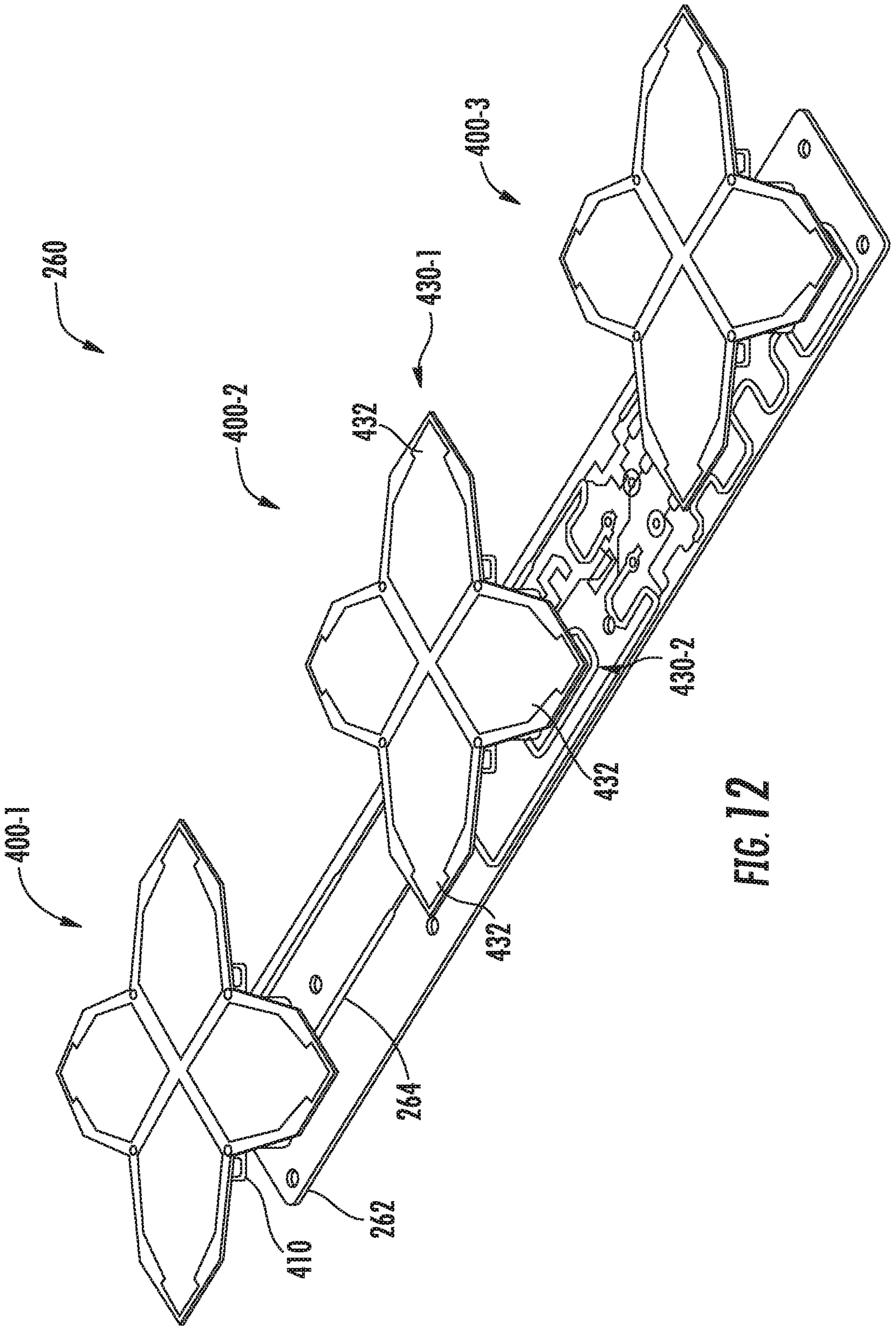
FIG. 12 is an enlarged perspective view of one of the high-band radiating element assemblies of the base station antenna of FIGS. 1-4.

FIG. 12 is a front perspective view of one of the high-band feed board assemblies 260 that are included in the base station antenna 100. As shown in FIG. 12, the high-band feed board assembly 260 includes a printed circuit board 262 that has three high band radiating elements 400-1, 400-2, 400-3 extending forwardly therefrom. The printed circuit board 262 includes RF transmission line feeds 264 that provide RF signals to, and receive RF signals from, the respective high-band radiating elements 400-1 through 400-3. Each high-band radiating element 400 includes a pair of feed stalks 410 that have a cross-dipole radiator 420 mounted thereon.

The feed stalks 410 may each comprise a pair of printed circuit boards that have RF transmission line feeds formed thereon. The feed stalks 410 may be assembled together to form a vertically-extending column that has generally x-shaped cross-sections. Each cross-dipole radiator 420 may also be implemented as a sheet metal-on-dielectric dipole radiator. In particular, cross-dipole radiator 420 may include four dipole arms 432 that together form first and second cross-polarized center fed metal dipoles 430-1, 430-2. The dipole arms 432 may be adhered to an underlying dielectric mounting substrate 440. As the cross-dipole radiator 420 may be identical to the cross-dipole radiator 320 discussed above except that the size thereof and the shape of the dipole arms 432 are modified for operation at the higher frequency band, further description of the cross-dipole radiators 420 will be omitted.

Figure 13:
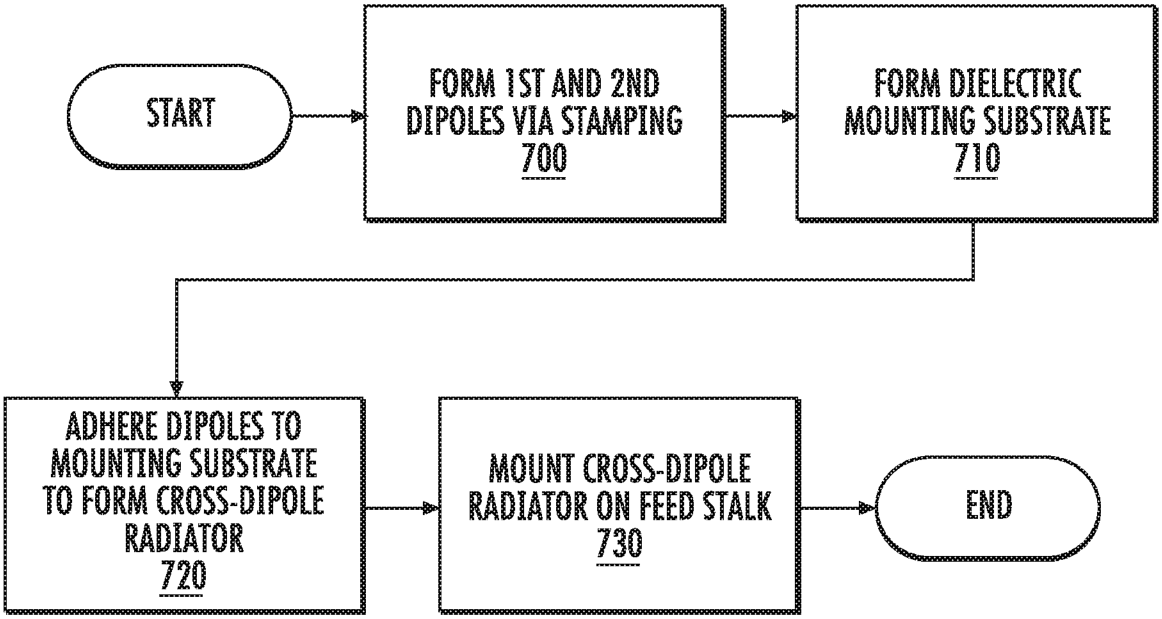
FIG. 13 is a flow chart illustrating a method of fabricating a radiating element according to embodiments of the present invention.

As shown in FIG. 13, pursuant to embodiments of the present invention, methods of fabricating a radiating element for a base station antenna are provided. Pursuant to these methods, first and second metal dipoles may be stamped from one or more sheets of sheet metal (block 700). In some cases, each metal dipole may comprise two dipole arms that are separately stamped, while in other embodiments, each metal dipole may be a monolithic structure that is formed in a single stamping operation. A dielectric mounting substrate is also formed using, for example, injection molding, another molding technique, or by cutting or stamping the dielectric mounting substrate from dielectric sheet material (block 710). The first and second metal dipoles may then be adhered to the dielectric mounting substrate using an adhesive to form a cross-dipole radiator (block 720). The cross-dipole radiator may then be mounted on a feed stalk (block 730).

While embodiments of the present invention have primarily been discussed above with respect to cross-dipole radiators, it will be appreciated that all of the above-described aspects of the present invention may be applied to single-polarization radiating elements that have a single dipole radiator as opposed to cross-polarized dipole radiators. It will likewise be appreciated that the techniques described herein may be used with any type of dual-polarized radiating element and not just with slant −45°/+45° dipole radiating elements.

The radiating elements according to embodiments of the present invention may provide a number of advantages over conventional radiating elements. As discussed above, the dipole radiators according to embodiments of the present invention may be significantly cheaper to manufacture as compared to printed circuit board dipole radiators. Additionally, because the thickness of the metal dipole arms may be, for example, five to forty-five times the thickness of low-cost printed circuit board dipole radiators, the dipole radiators according to embodiments of the present invention may exhibit reduced signal transmission loss and may have better impedance match with the RF transmission lines on the feed stalks, resulting in improved return loss performance.

Additionally, since the metal dipoles may be very smooth (i.e., almost no surface roughness), the dipole radiators according to embodiments of the present invention may exhibit improved PIM performance as compared to printed circuit board based dipole radiators, and the relatively large batch-to-batch variation that is present with printed circuit board based dipole radiators may be significantly reduced, providing more consistent RF performance. Moreover, since the dielectric mounting substrate may be injection molded to include desired cutouts, the fabrication step of cutting openings into printed circuit board based dipole radiators may be eliminated, further reducing manufacturing costs. Additionally, in some embodiments, the dipole radiators may include undulations that reduce the footprint thereof, and/or may include integrated dipole supports that provide increased stability.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A method of fabricating a radiating element for a base station antenna, the method comprising:

forming first through fourth metal dipole arms from one or more sheets of metal;

forming a dielectric mounting substrate via injection molding; and mounting the first through fourth metal dipole arms to the dielectric mounting substrate via an attachment mechanism, wherein each of the first through fourth metal dipole arms has spaced-apart first and second conductive segments that together form a generally oval shape, and wherein each of the first and second conductive segments of the first through fourth metal dipole arms includes a first widened section that has a first average width, a second widened section that has a second average width and a narrowed section that has a third average width, the narrowed section being between the first widened section and the second widened section, wherein the third average width is less than half the first average width and less than half the second average width.

2. The method of claim 1, wherein the dielectric mounting substrate includes a plurality of guides that extend from a first major surface thereof that are configured to mount the first through fourth metal dipole arms in pre-selected locations on the dielectric mounting substrate.

3. The method of claim 2, wherein the dielectric mounting substrate further includes a plurality of ribs on a second major surface thereof that is opposite the first major surface.

4. The method of claim 1, wherein distal ends of the first and second conductive segments of the first metal dipole arm are electrically connected to each other so that the first metal dipole arm has a closed loop structure.

5. The method of claim 1, wherein the narrowed section comprises a meandered conductive trace.

6. The method of claim 1, wherein the narrowed section creates a high impedance for currents that are at a frequency that is approximately twice the highest frequency in the operating frequency range of the radiating element.

7. The method of claim 1, wherein the attachment mechanism comprises one or more mechanical fasteners.

8. The method of claim 1, wherein each of the first through fourth dipole arms are non-planar dipole arms.

9. The method of claim 1, wherein the dielectric mounting substrate comprises a monolithic structure that has a generally planar dipole support plate and a plurality of support arms that extend rearwardly from the dipole support plate.

10. The method of claim 1, wherein a thickness of each of the first through fourth dipole arms is between 200 and 1800 microns.

11. The method of claim 1, further comprising mounting the dielectric mounting substrate having the first through fourth metal dipole arms mounted thereon on a separate feed stalk.

* * * * *